Figure 1:
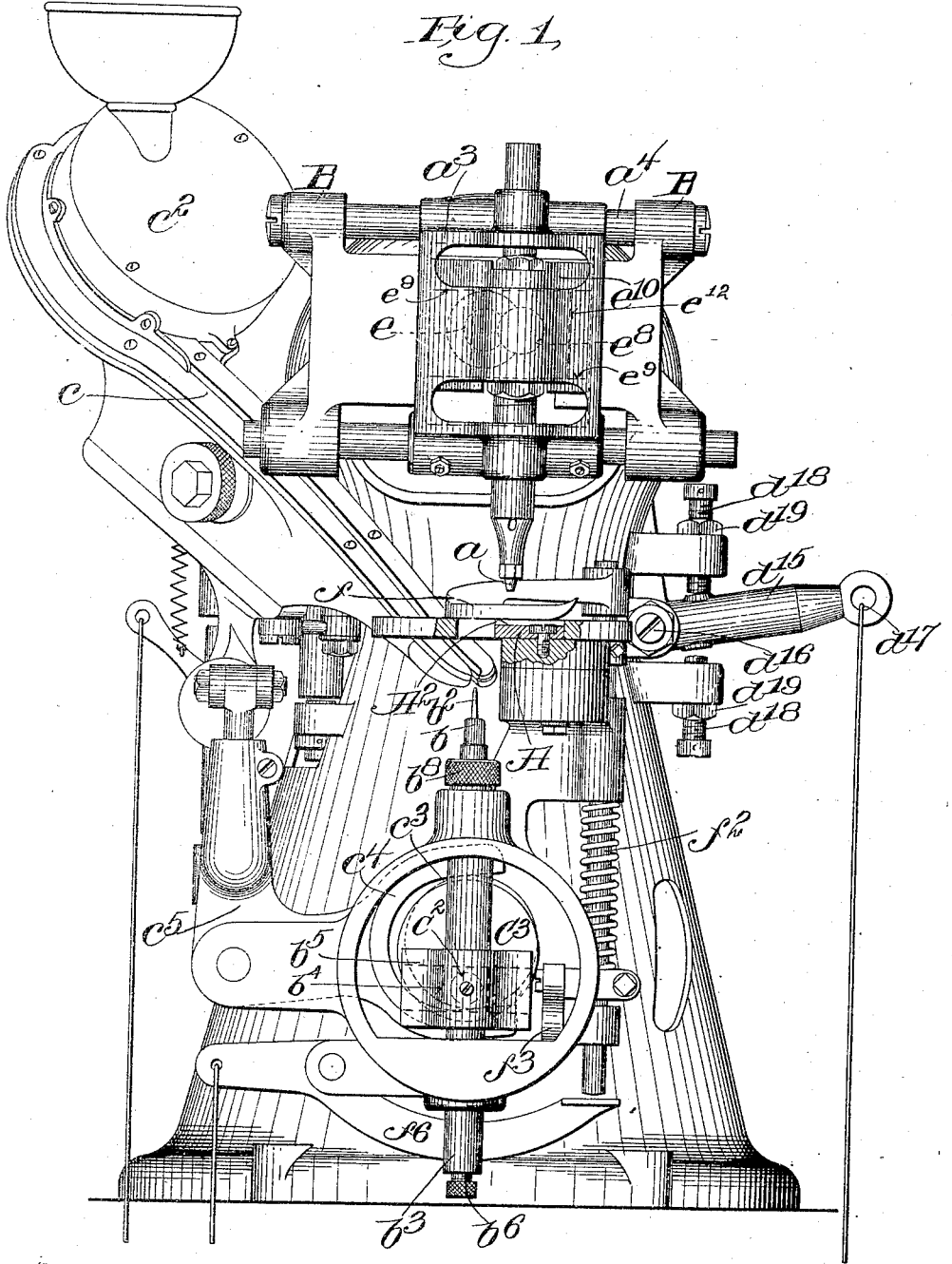

No. 686,928.  
P. R. GLASS.  
EYELETING MACHINE.  
(Application filed June 15, 1899.)  
Patented Nov. 19, 1901.

(No Model.) 4 Sheets—Sheet 1.

Witnesses  
Jas. J. Maloney  
Nancy P. Ford

Inventor,  
Perley R. Glass.  
by J. P. and H. J. Livermore  
Attys

No. 686,928. Patented Nov. 19, 1901.
P. R. GLASS.
EYELETING MACHINE.
(Application filed June 15, 1899.)
(No Model.) 4 Sheets—Sheet 2.
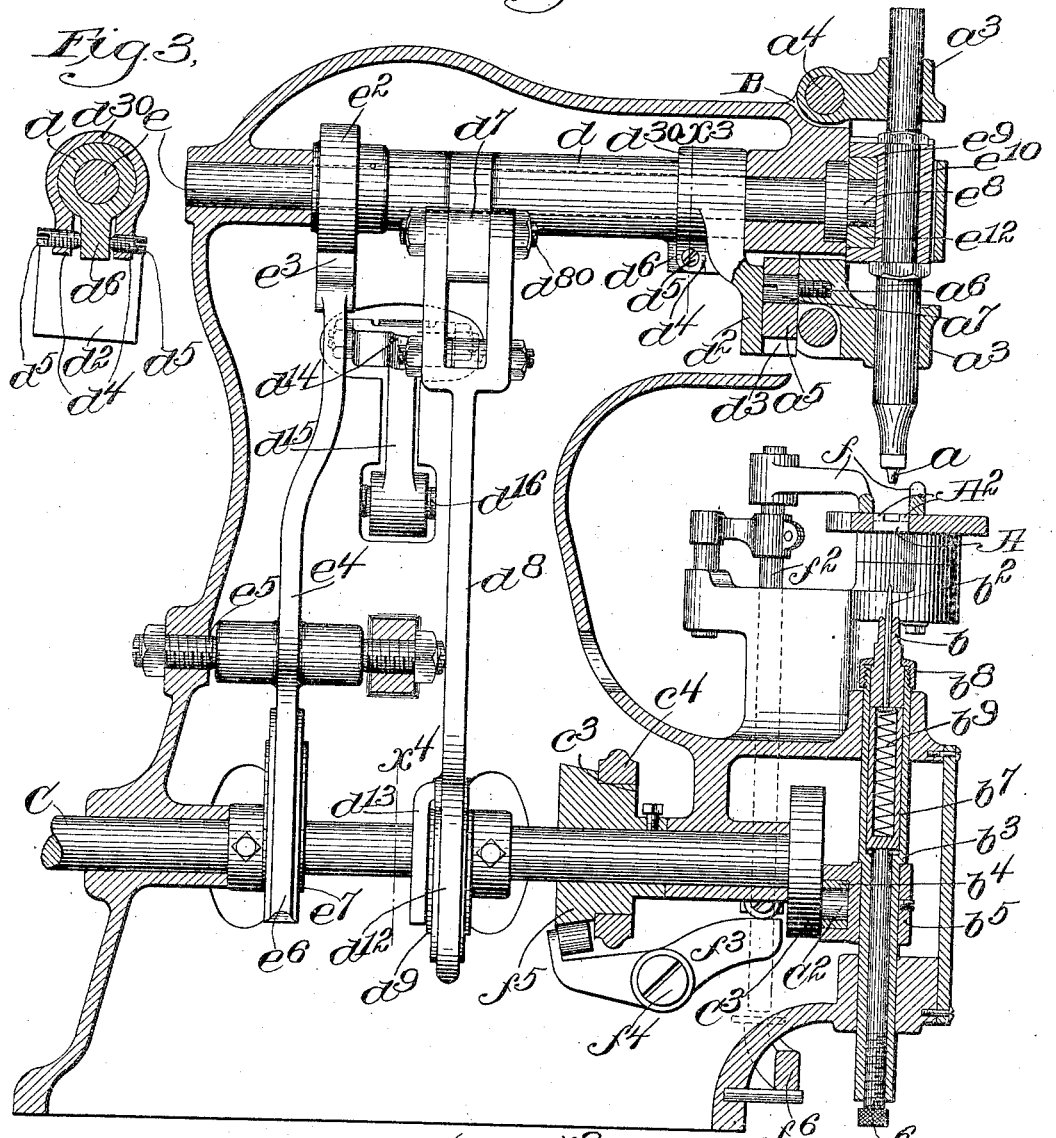

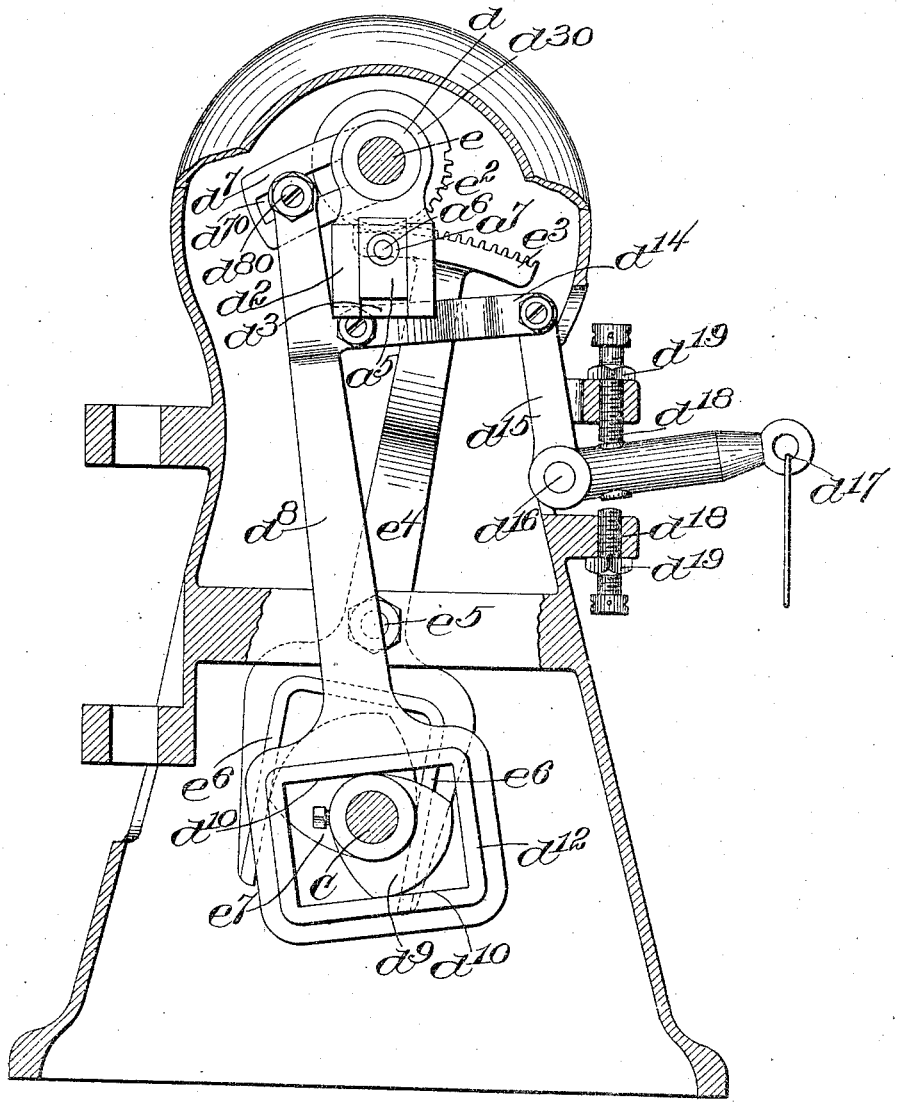

No. 686,928. Patented Nov. 19, 1901.
P. R. GLASS.
EYELETING MACHINE.
(Application filed June 15, 1899.)
(No Model.) 4 Sheets—Sheet 4.
Fig. 6.
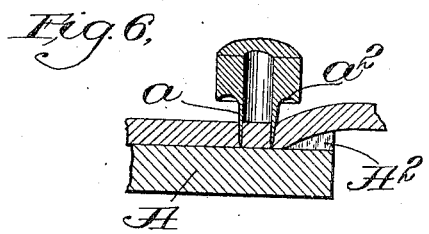
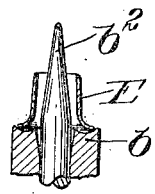
Fig. 7.
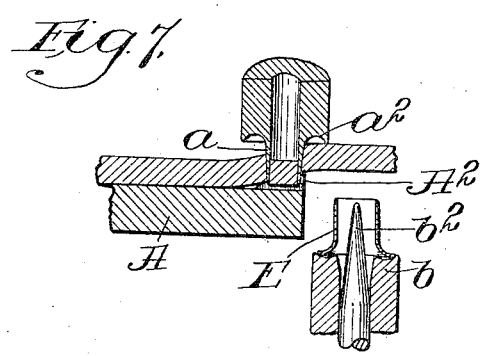
Fig. 8.
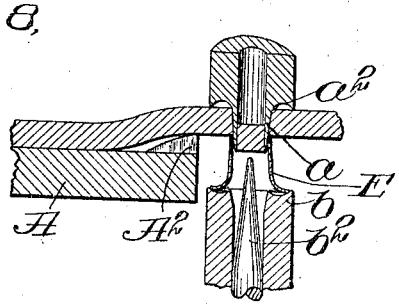
Fig. 9.
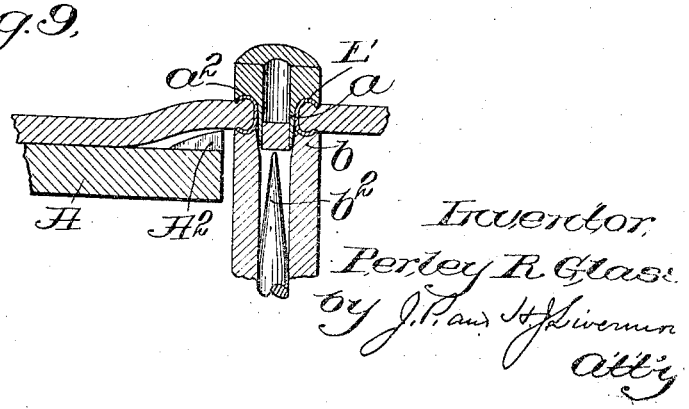
Witnesses
Jas. J. Maloney.
Nancy P. Ford.
Inventor
Perley R. Glass
by J. Paul H. Livermore
atty

UNITED STATES PATENT OFFICE.

PERLEY R. GLASS, OF QUINCY, MASSACHUSETTS, ASSIGNOR TO THE PEERLESS MACHINERY COMPANY, A CORPORATION OF WEST VIRGINIA.

EYELETING-MACHINE.

SPECIFICATION forming part of Letters Patent No. 686,928, dated November 19, 1901.

Application filed June 15, 1899. Serial No. 720,603. (No model.)

*To all whom it may concern:*

Be it known that I, PERLEY R. GLASS, of Quincy, county of Norfolk, and State of Massachusetts, have invented an Improvement in Eyeleting-Machines, of which the following description, in connection with the accompanying drawings, is a specification, like letters on the drawings representing like parts.

The present invention relates to an eyeleting-machine, and is embodied in a machine for setting eyelets, rivets, and the like, especially eyelets, the machine being mainly intended for work on leather stock, especially shoe-uppers.

The invention is shown as embodied in a machine substantially like that shown and described in Patent No. 636,035, granted to me October 31, 1899, and relates mainly to certain details of construction and arrangement, as will be hereinafter described.

Figure 1 is a front elevation of a machine embodying the invention; Fig. 2, a vertical section of the same; Fig. 3, a detail in section on the line $x^3$ of Fig. 2; Fig. 4, a similar detail in section on the line $x^4$ of Fig. 2; Fig. 5, a section on planes transverse to that of Fig. 2, the upper portion of said section being taken on a line at the rear of the punch-frame and the lower portion being taken on a line farther back and just in front of the feed-operating cam; and Figs. 6, 7, 8, and 9 are enlarged sectional details of the combined punch and setting-tool and the coöperating setting device, together with a portion of the feed-table to illustrate the successive steps in the operation, especially with a view to showing the manner of inserting and clenching the eyelet.

The machine embodying the invention comprises the tubular punch $a$, (shown as externally tapered and provided with the annular clenching-surface $a^2$,) the coöperating setting device $b$, (shown as provided with a spring-finger $b^2$,) and the eyelet-feed chute $c$, adapted to receive eyelets from the hopper $c^2$ and to be moved into and out of the path of the setting device $b$ in the usual way, so as to successively present the eyelets to the finger $b^2$ prior to the setting operation. The punch $a$ coöperates in the punching operation with a suitable anvil or support for the material, the punch and anvil thus constituting coöperating punching members, the said anvil A being indicated in Fig. 6, in which the punch is shown in the position assumed at the end of the punching operation. It is necessary, therefore, prior to the setting operation that a movement of one of the said punching members relative to the other should take place in order to permit the setting device $b$ to move toward the clenching-surface $a^2$ and to coöperate therewith in the setting operation.

As herein shown, the punch $a$ is arranged to have a lateral movement, the same lateral movement which brings the punch into a position to be met by the setting device also serving to feed the material after the same has been punched. To this end the punch is mounted in a laterally-movable frame $a^3$, (shown as capable of sliding on the guide-rod $a^4$,) supported in lugs B, formed in the front part of the frame of the machine. The punch is capable of a reciprocating longitudinal movement within said frame, as will be hereinafter described, so as to perform the actual punching operation, but is moved with the frame between successive punching operations, so as to feed the material and coöperate in completing the setting or clenching of the eyelet.

To produce the lateral movement of the frame $a^3$, the said frame is connected in accordance with the present invention with an oscillating member $d$, provided with a radial arm $d^2$, which arm is connected by a universal joint with the punch-frame $a^3$, so as to compensate for the difference between the curved and rectilinear movements of the two parts. As herein shown, the said arm $d^2$ is provided with a channel $d^3$, the walls of which engage a sliding block $a^5$, pivotally connected with the frame $a^3$, the said block being herein shown as held in position with relation to said frame by means of a screw $a^6$, having a rounded head $a^7$, which constitutes a bearing for the said block. In the oscillation of the said member $d$, therefore, the punch-frame will be laterally reciprocated, it being essential that the said punch-frame should come to rest at one end of its reciprocating movement in such a position that the punch will be in line with the setting device $b$ in order to coöperate therewith in setting the eyelet.

The member $d$ is oscillated in response to the rotation of the main shaft of the machine, as will be described, and the arm $d^2$ is shown as adjustably connected to said member, so that the exact position of the punch at the end of its feed movement may be properly arranged for. As herein shown, the said arm $d^2$ is provided with a hub or collar $d^{30}$, having ears or lugs $d^4$, each of which contains an adjusting-screw $d^5$, which coöperates with a tongue or projection $d^6$ from the member $d$. The distance between the lugs $d^4$ is somewhat greater than the thickness of the tongue $d^6$, so that by turning one or the other of the screws the position of the arm relative to the member $d$ may be determined, as best shown in Fig. 3.

In the construction shown the lateral movement of the punch is utilized to feed the material, so as to produce a completely automatic setting operation, the punch first descending to cut the material, then moving laterally to transfer the same to the setting device, and then returning to punch another opening prior to the next setting operation. It is desirable, however, to provide the machine with means for varying the extent of the feed movement in case it is necessary to set part of the eyelets at one distance apart and other eyelets in the same line at different distances apart. This is accomplished by varying the lateral or feed movement of the punch, and for this purpose the member $d$, which is shown as a sleeve having a bearing on the shaft $e$, which produces the vertical reciprocating movement of the punch, is provided with a arm $d^7$, projecting radially from said member and being connected with an actuating member $d^8$, which receives a reciprocating movement from a cam $d^9$ on the main shaft C of the machine, which is adapted to be continually rotated during the operation of the machine. The said cam $d^9$ coöperates with engaging surfaces $d^{10}$, formed in a frame $d^{12}$, connected with the member $d^8$, the said member also being provided with fingers or projections $d^{13}$, Fig. 4, constituting a fork embracing the shaft C, so as to keep the frame $d^{12}$ in proper position with relation to the cam $d^9$. These fingers are omitted from Fig. 5 in order to avoid confusion. Thus while the movement of the member $d^8$ is mainly a reciprocating movement, said member is free to turn slightly with relation to the shaft C, so as to properly follow the movement of the arm $d^7$, with which it is connected. Thus in the operation of the machine the rotation of the main shaft C, through the action of the cam $d^9$, the connecting member $d^8$, and the arm $d^7$, will oscillate the member $d$ in accordance with the shape of the cam $d^9$, so as to produce the necessary movement thereof to feed the material and return the punch to its normal position. The extent of such movement can also be varied by shifting the point of connection between the arm $d^7$ and the connecting member $d^8$ toward or from the axis of oscillation of the member $d$, and in order that the point of connection may be thus shifted readily by the attendant, even while the machine is in operation, the arm $d^8$ is shown as connected by means of a link $d^{14}$ with an actuating device, shown as an elbow-lever $d^{15}$, pivoted at $d^{16}$, one arm of said elbow-lever being connected at $d^{17}$ with a suitable actuating device, such as a treadle, (not herein shown,) the construction being substantially the same as shown in my patent above referred to. The distance to which the point of connection is shifted by the actuating device is determined by stops $d^{18}$, adjustable in suitable lugs and provided with lock-nuts $d^{19}$.

It is of course necessary that the punch should always be arrested at the end of its feed movement in such position that it will be directly in line with the lower setting device, so as to receive the eyelet therefrom and coöperate therewith in the setting operation. To this end the member $d^8$ is connected with the arm $d^7$ by means of a stud $d^{80}$, arranged to engage the walls of a slot $d^{70}$ in the member $d^7$, and the said walls of the said slot $d^{70}$ are curved upon the arc of a circle struck from the axis of the shaft C when the said arm $d^7$ is in such a position that the punch is directly in line with the lower set. It is obvious, therefore, that no matter to what position the stud $d^{80}$ is shifted there will be no variation in the position of the punch at this point of its travel, so that no matter what the feed movement may be the said punch will always be arrested in the proper position with relation to the setting device.

The vertical movement of the punch is produced, as has been stated, through the agency of the shaft $e$, which is connected with a gear $e^2$, coöperating with a segmental gear $e^3$, connected with an arm $e^4$, pivoted at $e^5$ on a portion of the frame of the machine and provided with arms $e^6$, constituting a forked extremity to engage opposite sides of the cam $e^7$ upon the main shaft C. As the said shaft rotates, therefore, the arm $e^4$ will be swung upon its pivot, thus producing an oscillating movement of the shaft $e$, which is provided with an eccentric $e^8$, which coöperates with engaging surfaces $e^9$, fixed with relation to the punch and shown as formed in a block or frame $e^{10}$, which is connected with the punch $a$. The said surfaces constitute the walls of an elongated channel, so that the block $e^{10}$ is free to travel laterally with relation to the eccentric $e^8$ and to coöperate therewith, regardless of the lateral position of the said block and punch.

As herein shown, the eccentric $e^8$ does not engage directly with the surfaces $e^9$, but is fitted into an intermediate block $e^{12}$, which fits in the said channel and practically constitutes an intermediate eccentric-strap. As the shaft oscillates, therefore, the punch is carried downward toward the anvil to punch the material, and in order to free the punch from the anvil prior to the lateral movement the parts are so arranged that the eccentric turns far enough in the oscillation of the shaft to carry the punch down into contact with the anvil and then slightly up away from the same, the cam $e^7$ being so shaped that there is a dwell in the movement of the shaft $e$ at the end of this time, while the lateral movement of the punch-frame immediately begins. This is illustrated in Figs. 6 and 7, Fig. 6 showing the position of the punch at the completion of the punching operation and Fig. 7 the position of the punch after the feed movement has begun.

The slight upward movement of the punch prior to the lateral feed movement separates the same from the anvil or coöperating punching member, so that the lateral movement may be freely accomplished, it being obvious, however, that the parts may be so timed that these movements may begin almost simultaneously, thereby insuring great rapidity of operation. It will be seen, however, from Fig. 6 that at the end of the punching operation the cutting edge of the punch is on a level with the lower surface of the material and that it does not project beyond the surface of the material at all. It is desirable, however, that the punch should be somewhat smaller than the edge of the eyelet which is to be set in order to obviate all liability that the edge of the punch and the edge of the eyelet may come in contact with each other, and thereby injure or destroy one or both, and in any event prevent the proper setting of the eyelet in that particular hole. With the punch smaller than the eyelet, however, and flush with the surface of the material the eyelet instead of entering the opening in the material would come in contact with the uncut material around the punch if the material were allowed to remain in the position shown in Fig. 6 during the setting operation. To insure the proper setting, therefore, and to assist in guiding the eyelet into the opening, the machine is provided with means for forcing the punch completely through the material until it projects beyond the surface of the same after the punching operation is completed and prior to the setting operation. As herein shown, this is accomplished by providing the anvil A or any suitable portion of the feed-table with projecting fingers $A^2$. (Shown on a large scale in Figs. 6, 7, 8, and 9.) These fingers project upward beyond the end of the punch, one at each side thereof, as the said punch travels laterally from the position shown in Fig. 6 to the position shown in Figs. 8 and 9. The material carried along by the punch, therefore, will come in contact with the upper surfaces of the fingers $A^2$ and will be forced upward onto the punch, as shown in Fig. 7, so that when the said punch is in the position to coöperate with the setting device it will project wholly through the material and beyond the lower surface of the same. This is best shown in Fig. 8, in which it will be seen that the punch projects into the eyelet E until the edge of the eyelet engages the tapered walls of the punch, and is thereby guided into the hole made in the material, which is enlarged sufficiently to properly receive the eyelet, so that the said eyelet cannot fail to enter and be upset or clenched, as shown in Fig. 9.

It is obvious that the means for forcing the material after the punch through the material after the punching operation may be readily modified, and it is not intended, therefore, to limit the invention to the particular means herein shown and described.

The lower set $b$ is carried by a vertical reciprocating rod $b^3$, adapted to be reciprocated by means of a wrist-pin $C^2$ upon a disk $C^3$, formed upon the main shaft C. The said wrist-pin $C^2$ enters an opening in a block $b^4$, capable of sliding in a cross-head $b^5$, suitably connected with the rod $b^3$, so as to produce a regular reciprocating movement of the setting device $b$. The said setting device $b$ is vertically adjustable with relation to the rod $b^3$ by means of a screw-threaded adjusting member $b^6$, which bears against the end of a shell $b^7$, which in turn engages the end portion of the set $b$, the upper portion of said set being engaged by an annular cap or nut $b^8$. In adjusting the set the nut $b^8$ is turned to such a position as to determine the proper position of the set, and the adjusting member $b^6$ is then screwed up until the parts are locked, as will be easily understood by reference to Fig. 2.

The finger $b^2$ is acted upon by a spring $b^9$, contained in the shell $b^7$. The said finger, which is adapted to pick up an eyelet from the chute $c$ in the usual way, is tapered so as not to come in contact with the edge of the punch and will usually be depressed by contact with the piece of leather last punched out of the material.

To retain the material in position after the setting operation has taken place and prior to the return movement of the punch, the machine is provided with a gripper member $f$, spring-pressed against the feed-table or anvil, as shown, and connected with a vertically-movable rod $f^2$, acted upon by an arm $f^3$, pivoted at $f^4$ and operated by a cam $f^5$ on the shaft C. The parts are so timed that the gripper descends and engages the material just after the feed movement is completed and remains in engagement therewith as the punch and setting device move apart. To enable the operator to insert the material prior to starting the machine, the gripper member is also arranged to be acted upon by a lever $f^6$, connected with a suitable treadle or actuating device. (Not shown.)

The feed-chute $c$ may be reciprocated or oscillated in any suitable or usual way to present the eyelets to the setting device and is herein shown as oscillated by means of a cam $c^3$, acting on the forked extremity $c^4$ of an elbow-lever $c^5$, suitably connected with an oscillating frame which carries the said eyelet-chute and feed-hopper, the construction and arrangement of which need not be further described, since they form no part of the present invention.

I claim—

1. In an eyeleting-machine, the combination with the punch; of an eccentric coöperating with surfaces fixed with relation to said punch to produce a reciprocating longitudinal movement thereof; a shaft carrying said eccentric; means for oscillating the said shaft; a laterally-movable guide-frame for the punch; a sleeve bearing upon said oscillating shaft and having a radial arm connected with said guide-frame; and means for oscillating said sleeve, as set forth.

2. In an eyeleting-machine, the combination with the punch provided with a clenching portion and a tubular cutting portion; of means for producing a longitudinal and a lateral movement of said punch to punch and feed the material respectively; an anvil coöperating with said punch; means for moving said punch to separate the same from said anvil but not from the material prior to the lateral feed movement; a setting device to coöperate with the clenching portion of the punch after the feed movement has taken place; and means for forcing the punch through the material so that it projects beyond the surface of the same after leaving the anvil, as set forth.

3. In an eyeleting-machine, the combination with the punch having a tubular cutting projection and an annular clenching-shoulder surrounding said projection; of an anvil to coöperate with the said projection in the punching operation; an eccentric for reciprocating said punch toward and from said anvil; a laterally-movable guide-frame for said punch; means for producing a movement of said frame while the punch is in the material; fingers or projections to engage the material during the movement of the punch and press said material onto the punch; and a setting device adapted to coöperate with said punch at the end of the feed movement thereof to clench the eyelet in the material.

4. In an eyeleting-machine, the combination with the punch having a tubular cutting projection and an annular clenching-shoulder surrounding said tubular cutting projection; of an anvil to coöperate with the cutting projection; an eccentric for reciprocating said punch toward and from the said anvil; a laterally-movable guide-frame for said punch; means for producing a movement of said frame while the punch is in the material; fingers or projections to engage the material during the movement of the punch and press said material onto the punch; and a setting device adapted to move toward said punch at the end of said feed movement and to coöperate therewith in setting an eyelet in the material.

In testimony whereof I have signed my name to this specification in the presence of two subscribing witnesses.

PERLEY R. GLASS.

Witnesses:
 HENRY J. LIVERMORE,
 NANCY P. FORD.